Dec. 22, 1959  P. MAUBORGNE  2,918,227
VARIABLE DRIVE DEVICE FOR FISHING WINCHES
Filed Oct. 12, 1953  2 Sheets-Sheet 1

INVENTOR.
P. Mauborgne
BY
ATTYS.

United States Patent Office 2,918,227
Patented Dec. 22, 1959

2,918,227

VARIABLE DRIVE DEVICE FOR FISHING WINCHES

Paul Mauborgne, Bernouville, France

Application October 12, 1953, Serial No. 385,620

Claims priority, application France November 3, 1952

2 Claims. (Cl. 242—84.21)

This invention relates to fishing winches, both of the type known as rotary spool winches and also of the type known as fixed drum winches.

The driving of the moving parts of a fishing winch may necessitate a variable degree of slip between the driving member and the driven moving members, more particularly in order to prevent breakage of the line when excessive force is exerted by the fish.

It has already been proposed to make this slip possible either by interposing a friction coupling at a suitable point in the system of transmission of movement (this is applicable to both types of winches) or, in the case of fixed drum winches by interposing a friction coupling between the spool, which is generally fixed, and the frame or casing on which it is mounted.

The object of the present invention is to solve the problem of the slip by employing a transmission device having a variable ratio.

Another object of the invention is to make it possible to control the degree of slip at all times without having to suspend the movement in order to effect adjustment.

According to the invention, the variable ratio transmission device will be an epicyclic gear train of which the ratio is made to vary by braking either one of the wheels having a fixed centre, or the wheel having a movable centre.

Figure 1:
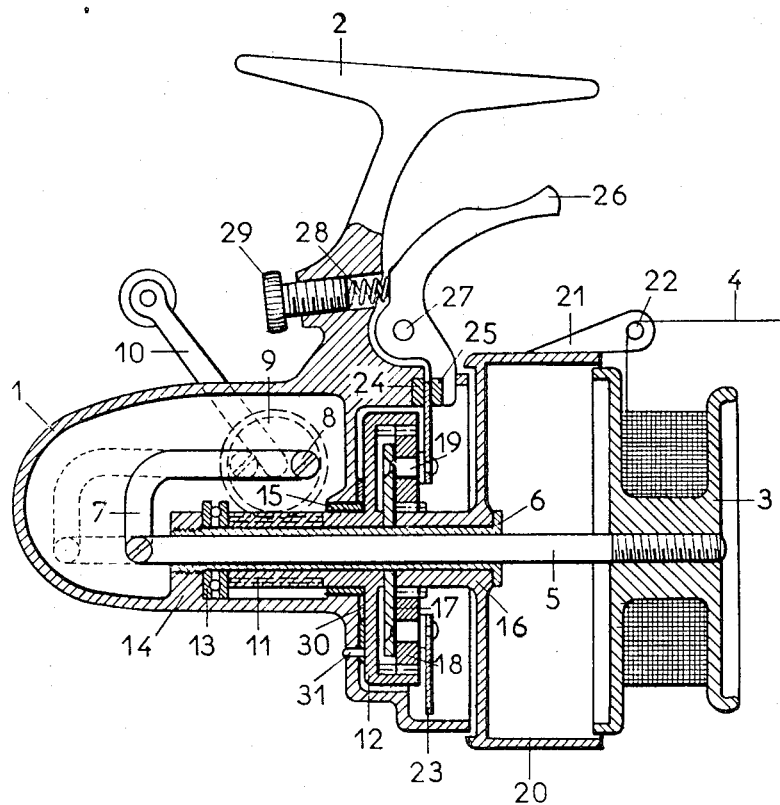
Figure 2:
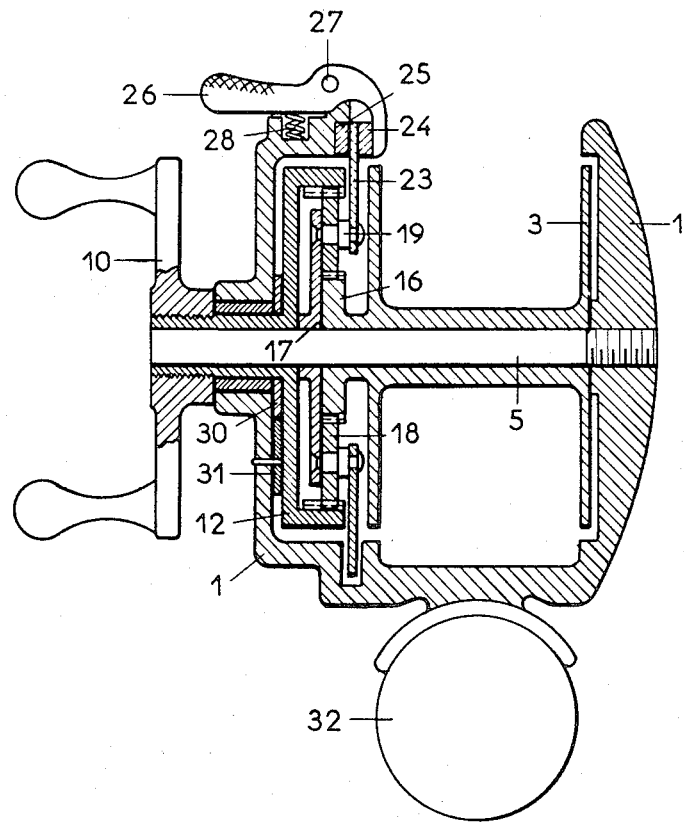

Embodiments of the invention in which the braking is applied to the wheel having a movable centre through the intermediary of the frame are described hereinafter with reference to the accompanying drawings, in which:

Fig. 1 is a section through a winch of the type known as the fixed drum type, in a plane passing through the axis of rotation, and Fig. 2 is a section through a winch of the rotary spool type, in a plane passing through the axis of rotation.

In Fig. 1, 1 generally designates the casing of the winch which is fixed by means of a support 2 to a fishing rod not shown in the drawing. A spool 3 on which the line 4 is wound up is keyed to a shaft 5 of which the direction is substantially parallel to that of the fishing rod. The shaft 5 is accommodated in a sleeve 6 rigid with the casing 1, and can be displaced in translation in this sleeve. Reciprocating movement of the shaft 5 in the sleeve 6 is obtained by means of a link 7 pivoted to a crank pin 8, this pin being itself fixed to a wheel 9 driven by means of a crank 10 outside the casing.

A pinion 11 and an internally toothed gear wheel 12 are rotatably mounted on the sleeve 6. The members 11 and 12 are rigid for rotation with one another and in the drawing, they are shown as integral with one another.

The pinion 11 bears, through the intermediary of a ball bearing 13, against a bracket 14 rigid with the casing 1. The external teeth of the pinion 11 meshes with the wheel 9 which communicates to the said pinion a movement of rotation about the shaft 5. A smooth cylindrical portion situated between the pinion 11 and the wheel 12 rotates in a bearing 15. The wheel 12 constitutes the crown of an epicyclic gear train of which the sun wheel 16 rotates freely on the sleeve 6. The frame or carrier 17 which also rotates freely on the sleeve 6 carries in the usual manner a certain number of satellites or planet gears such as 18 rotating freely about shafts such as 19 supported by the frame 17.

The sun wheel 16 is rigid with a fly-wheel 20 which is a hollow cylindrical member or drum of sufficiently large dimensions to accommodate inside it the spool 3. To the outside of the fly-wheel 20 is fixed the normal thread pick-up 21 which is the winding means. The member 21 picks up the line thread 4, for instance through the intermediary of an idling roller 22. The special relationships are such that in the reciprocating movement of translation imparted to the spool 3 by the shaft 5, the spool moves into and out of the cavity in the drum 20, the drawing showing the spool in its outermost position. To the frame 17 is fixed a braking ring 23. In the embodiment illustrated in the drawing, the shafts 19 of the satellites 18 are used as means for attaching the ring 23. The outer edges of the ring 23 pass between jaws 24 and 25. The jaw 24 is rigid with the casing 1. The jaw 25 is carried by a lever 26 pivoted on a shaft 27 rigid with the support 2. The jaws 24 and 25 will be constructed in any suitable manner enabling them to exert by friction a braking action on the ring 23. The lever 26 is subjected to the action of a spring 28 tending to close the jaws 24 and 25. In the embodiment illustrated the spring 28 is accommodated in the support 2, and its stress can be adjusted by means of an adjusting screw 29.

The manner of operation is as follows:

On casting, the fisherman disengages the thread 4 from the roller 22 of the pick-up. The thread can then unwind freely. This is the known principle of winches of the fixed drum type.

When a fish has been hooked, in order to bring it in the fisherman winds the thread 4 on to the spool 3 by acting on the crank 10 in the proper direction, after having again engaged the thread 4 over the roller 22.

The rotary movement can be transmitted from the pinion 11 to the sun wheel 16, and thence to the fly-wheel 20, only if the frame 17 is braked, this braking either immobilizing the frame 17 completely or permitting a certain amount of slip. Generally, the stress of the spring 28 is adjusted so that the frame 17 will be stationary when the fish is reacting normally. The epicyclic gear train then effects transmission of movement in the same way as an ordinary gear train. If the fish exerts an abnormal force, the braking is no longer sufficient to immobilize the frame, which then rotates. The transmission ratio of the gear train decreases, and may even become zero. If the force exerted by the fish exceeds the value for which the ratio would become zero, the fly-wheel may rotate in the opposite direction: the line 4 then unwinds instead of winding up.

According to the invention, the fisherman can vary the value of the braking while playing the fish, by acting on the lever 26 with one finger of the hand holding the line. He will reduce or increase the value of the braking, according to the direction in which he acts on the lever 26. During this time he will continue to turn the crank 10 with a continuous and regular movement, with his other hand. The fisherman will therefore be able to tire the fish by more or less abrupt variations of the braking. If on the other hand the braking value has been adjusted so as to correspond approximately to the breaking strength of the line, the apparatus according to the invention allows line to be yielded to the fish if the force exerted by the latter threatens to exceed the breaking point.

While the line 4 is being wound onto the spool 3, the alternating movement of the shaft 5 and therefore of the spool 3 in a known manner ensure satisfactory spreading of the thread over the whole length of the throat or drum of the spool.

A ratchet wheel 30 is rigid with the crown 12 and is subjected to the action of the usual pawl 31 which prevents the crank 10 from rotating in the unwinding direction when the pawl is engaged with the teeth of the ratchet wheel and when the brake jaws 24 and 25 clamp the ring 23.

Fig. 2 is an axial section through a winch of the rotary spool type, in which the shaft 5 of the spool is perpendicular to the fishing rod 32 and the spool rotates as the line unwinds.

In this figure, the same references as in Fig. 1 have been used for parts performing the same functions.

The crank 10 and the crown 12, rigid with one another in rotation, rotate about the shaft 5 which is fixed relatively to the casing 1.

The spool 3 and the sun wheel 16 are also rigid with one another in rotation and rotate about the shaft 5.

The frame 17 also rotates freely about the shaft 5 and carries satellites 18 which together with the crown 12 and the sun wheel 16 constitute the epicyclic gear train.

As in the preceding example, the frame 17 carries the braking ring 23 fixed on or by means of the shafts 19 of the satellites, this ring passing between the braking jaws 24 and 25.

As in the preceding example, the jaw 24 is rigid with the casing 1, whereas the jaw 25 is carried by the lever 26 pivoted about hte shaft 27 rigid with the casing 1. The lever 26 is subjected to the action of the spring 28.

For the sake of simplicity, the means for changing the stress on the spring 28 have been omitted from the drawing.

The ratchet wheel 30 is rigid with the crown 12 and is subjected to the action of the usual pawl 31 preventing the crank 10 and the crown 12 from rotating in the unwinding direction when the pawl is engaged with the teeth of the ratchet wheel and when the brake jaws 24 and 25 clamp the ring 23.

The manner of operation is as follows:

On casting, the fisherman renders the brake completely inoperative by pressing on the lever 26. The spool then turns freely and allows the line to unwind. After a fish has been hooked, the fisherman ceases to exert any action on the lever 26, so that the normal braking is produced by the action of the spring 28 and transmission of movement of the crank 10 causes the spool to rotate in the direction for winding up the line.

As in the preceding case, abnormal force exerted by the fish causes slipping of the transmission and therefore a reduction in the transmission ratio: the spool may even rotate in the unwinding direction if the force exerted by the fish exceeds the value at which the transmission ratio is zero.

What I claim is:

1. In a fishing winch, a casing, a non-rotatable spool associated with the casing, a rotating member supported by the casing, a line pick-up on the rotating member for winding the line onto the spool, a crank rotatably mounted on the casing, an epicyclic gear train on the casing and including a sun gear means, a planet carrier means, and planet gear means on the planet carrier means and in engagement with the sun gear means, a friction surface means secured to said planet carrier means, means operatively connecting one of said gear train means with the crank, further means connecting one of said gear train means with the rotating member, drag means on the casing for frictional engagement with said friction surface means, finger pressure actuated means on the casing adapted to be actuated by a finger of the hand holding the rod outside of the zone swept by the rotation of the crank for varying the dragging action of the drag means on the friction surface means notwithstanding the rotation of the crank by the other hand, and additional means associated with the finger pressure actuated means and the casing normally pressing the drag means in frictional engagement with said friction surface means.

2. In a fishing winch, a spool, a winch support for fixedly attaching the winch to a rod with the spool axis extending substantially in the direction of the rod, means normally holding the spool against rotation, a line winder rotatable about the spool and means for rotating the line winder, said means including a crank and an epicyclic gear train for transmitting the rotary movement of the crank to the line winder, the epicyclic gear train comprising a sun gear means, a planet carrier means and planet gear means on the planet carrier means and in engagement with the sun gear means, means operatively connecting one of said gear train means with the crank, further means operatively connecting one of said gear train means with a line winder, a friction surface means secured to one of said gear train means, drag means for frictional engagement with said friction surface means, finger pressure actuated means cooperable with said friction surface means and adapted to be actuated by a finger of the hand holding the rod outside of the zone swept by the crank for varying dragging action of the drag means notwithstanding the rotation of the crank by the other hand, and additional means associated with the finger pressure actuated means normally pressing the drag means in frictional engagement with said friction surface means.

References Cited in the file of this patent

UNITED STATES PATENTS

| 206,734 | Jacker | Aug. 6, 1879 |
| 838,915 | Sykes | Dec. 18, 1906 |
| 1,353,113 | Deets | Sept. 14, 1920 |
| 2,180,321 | Kovalovsky et al. | Nov. 14, 1939 |
| 2,600,558 | Mauborgne | June 17, 1952 |
| 2,613,468 | Hand | Oct. 14, 1952 |
| 2,624,523 | Sawitzke | Jan. 6, 1953 |

FOREIGN PATENTS

| 427,757 | Italy | Nov. 27, 1944 |
| 256,183 | Switzerland | Feb. 16, 1949 |